United States Patent
Marsten

(10) Patent No.: US 8,301,486 B1
(45) Date of Patent: Oct. 30, 2012

(54) DEMAND MODELING AND FORECASTING FOR CONFIGURABLE PRODUCTS OR SERVICES

(75) Inventor: Roy Earl Marsten, Atlanta, GA (US)

(73) Assignee: EMCIEN, Inc., Atlanta, GA (US)

( * ) Notice: Subject to any disclaimer, the term of this patent is extended or adjusted under 35 U.S.C. 154(b) by 994 days.

(21) Appl. No.: 12/209,429

(22) Filed: Sep. 12, 2008

Related U.S. Application Data

(60) Provisional application No. 60/972,609, filed on Sep. 14, 2007, provisional application No. 61/041,322, filed on Apr. 1, 2008.

(51) Int. Cl.
*G06Q 30/00* (2012.01)
*G06Q 10/00* (2012.01)

(52) U.S. Cl. ............ 705/7.31; 705/7.29; 705/36 R

(58) Field of Classification Search ............ 705/7.25, 705/7.28, 7.29, 7.31, 36 R; 1/1; 707/5
See application file for complete search history.

(56) References Cited

U.S. PATENT DOCUMENTS

| | | | |
|---|---|---|---|
| 6,151,582 A * | 11/2000 | Huang et al. ............ | 705/7.25 |
| 6,516,301 B1 * | 2/2003 | Aykin ............ | 705/7.25 |
| 6,826,538 B1 * | 11/2004 | Kalyan et al. ............ | 705/7.25 |
| 7,124,101 B1 * | 10/2006 | Mikurak ............ | 705/35 |
| 7,249,068 B1 * | 7/2007 | Kakouros et al. ............ | 705/28 |
| 2002/0188499 A1 * | 12/2002 | Jenkins et al. ............ | 705/10 |
| 2003/0050826 A1 * | 3/2003 | Cargille et al. ............ | 705/10 |
| 2005/0209732 A1 * | 9/2005 | Audimoolam et al. ............ | 700/216 |
| 2007/0270990 A1 * | 11/2007 | Katircioglu ............ | 700/99 |
| 2008/0040245 A1 * | 2/2008 | Wadawadigi et al. ............ | 705/28 |
| 2008/0140688 A1 * | 6/2008 | Clayton et al. ............ | 707/100 |

* cited by examiner

*Primary Examiner* — Thomas Dixon
*Assistant Examiner* — Gerald Vizvary
(74) *Attorney, Agent, or Firm* — Smith Risley; Steven P. Wigmore

(57) ABSTRACT

A system and method for modeling demand for a configurable product or service and then forecasting demand for said product or service based on the statistical associations of options across features within said product or service. By use of this method a manufacturer, for example, would be able to produce product combinations in advance with an increased probability that they would meet customer demand or project parts inventory needs and build fewer unwanted combinations.

18 Claims, 8 Drawing Sheets

DEMAND MODELING AND FORECASTING FOR CONFIGURABLE PRODUCTS OR SERVICES

CROSS-REFERENCE TO RELATED APPLICATIONS

The present application claims the benefit of U.S. Provisional Application Ser. No. 60/972,609 filed on 14 Sep. 2007 and U.S. Provisional Application Ser. No. 61/041,322 filed on 1 Apr. 2008, the complete subject matter of each of which is hereby incorporated herein by reference in its entirety.

TECHNICAL FIELD

The invention relates to a method for modeling demand and forecasting or predicting configurable products or services that are likely to meet consumer demand.

BACKGROUND

Most configurable manufactured products are offered as several different models. Products, particularly through the view necessary to understand this invention, are a collection of features. These features correspond to choices offered to the customer. Products with several features usually have compatibility rules that govern which combinations of features can be ordered. These rules may express engineering or marketing restrictions, and these rules separate the set of all possible product configurations into those that are valid and those that are invalid. The current practice in forecasting is to produce an aggregate forecast for the total number of products and then use the first-order take rates of the several models to derive a forecast for each model.

SUMMARY

The summary below is provided to help the reader get an initial understanding of a portion of the disclosure. It is not a substitute for a full reading of the entire disclosure nor a statement of the scope of the invention. For the latter, reference is made to the claims which define the scope.

The disclosure includes a process system and apparatus for modeling demand for a configurable product or service having an input data set containing a plurality of features composed of options for the configurable product or service; defining an option-set as a selection of at least one choice from at least one feature; defining a feature-set as a selection of one option each of at least two features; obtaining a joint-take-rate for each option-set; defining a joint-take-rate as the combined probability of choosing each selected option comprising said option set; cumulating said joint-take-rates to determine whether a feature-set meets a predetermined threshold of significance; defining an option-set using a weighted random selection that relies on said joint-take-rate for each option-set from each feature-set that passes said predetermined threshold for significance; choosing an option-set using a weighted random selection that relies on said joint-take-rate for each option-set from each feature that is not part of a feature-set; combining said randomly selected option-sets and said randomly selected options to define at least one configurable product or service.

There are many other features of the disclosure. This is just a summary of one of them.

DETAILED DESCRIPTION

The invention includes a system and method for modeling demand for a configurable product or service by identifying associations between different features within the product or service. There are many possible uses of this inventive concept, one of which is in manufacturing products where there are a multitude of possible features and the manufacturer needs to predict purchaser demand for certain combinations so as to pre-build the most popular combinations in quantities which best approximate demand. These and other manufacturers may need this information to predict the quantities of various parts to order. Services are likewise applicable to this inventive technique, where a service provider will try to bundle certain features together which will be most attractive to purchasers. Knowing (or predicting) purchaser demand, makes delivery of products and services less costly and more efficient.

In order to facilitate an understanding of the invention, a limited number of concrete examples are discussed, in particular, automobile assembly, but these examples are selected merely to facilitate understanding and are not intended to limit the invention.

Figure 1:
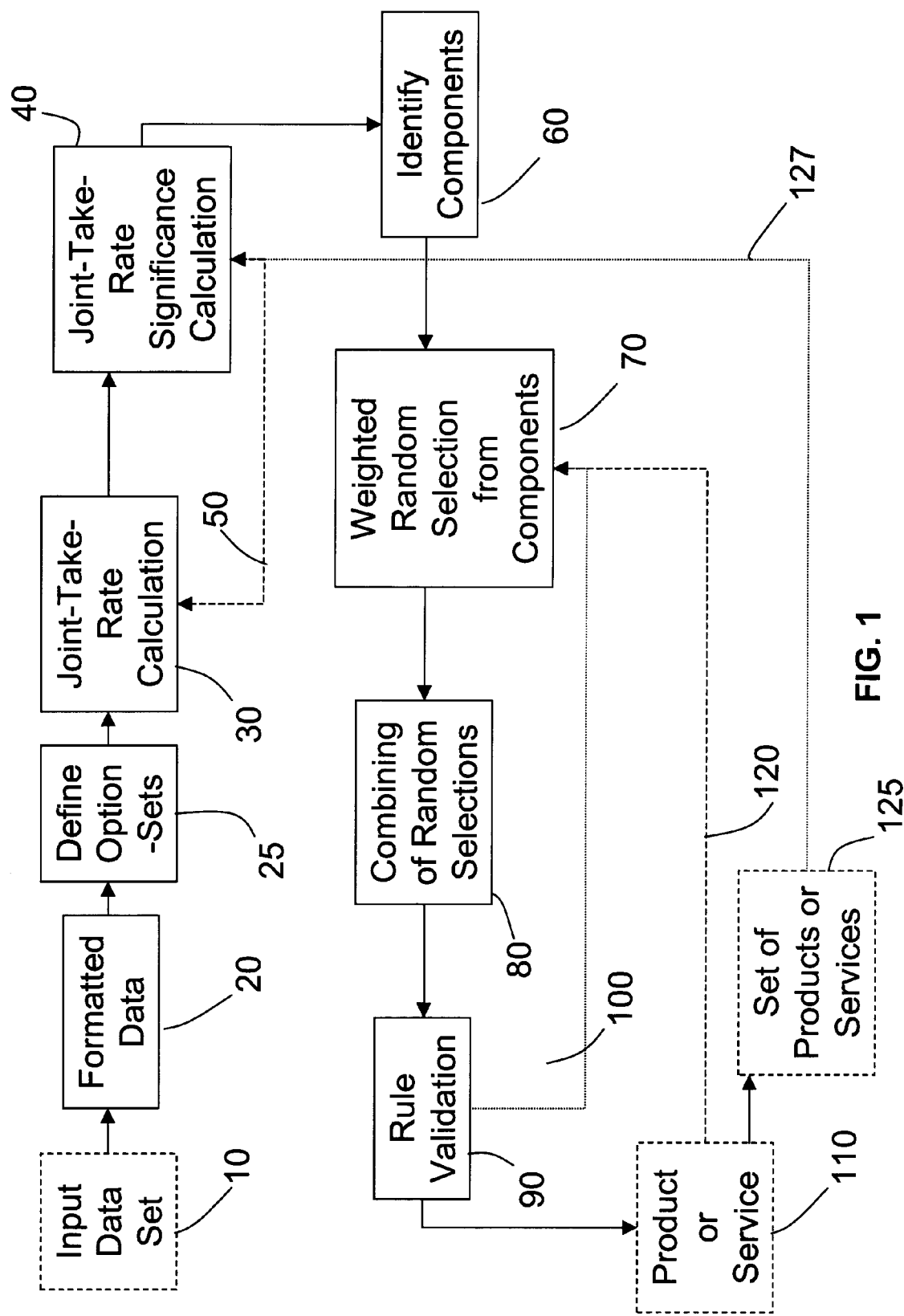
FIG. 1 is a flow chart demonstrating one embodiment of the invention.

A product is typically a collection of features assembled into a single, final unit. These features are comprised of choices, or options, offered to the customer. For example, an option can include the choice between cloth or leather seats in a car, or the choice between an 80- or 120-gigabyte hard drive in a computer. Although each feature has a set of alternative options, some features are just binary, such as air conditioning, wherein that feature is either included in the product or not. In such case the feature does not have sub-options. The air conditioner is either present or not. Meanwhile, some features have compatibility rules that govern which combinations of features can be ordered. As illustrated in FIG. 1, rules may be validated (100) by express engineering or marketing restrictions, and the rules separate the set of all possible product configurations into those that are valid and those that are invalid. For example, by rule, a green auto exterior may not have a red interior, so that combination of features is deemed invalid. This methodology applies equally well to service products, such as the deductible level and other features within an insurance policy.

Figure 8:
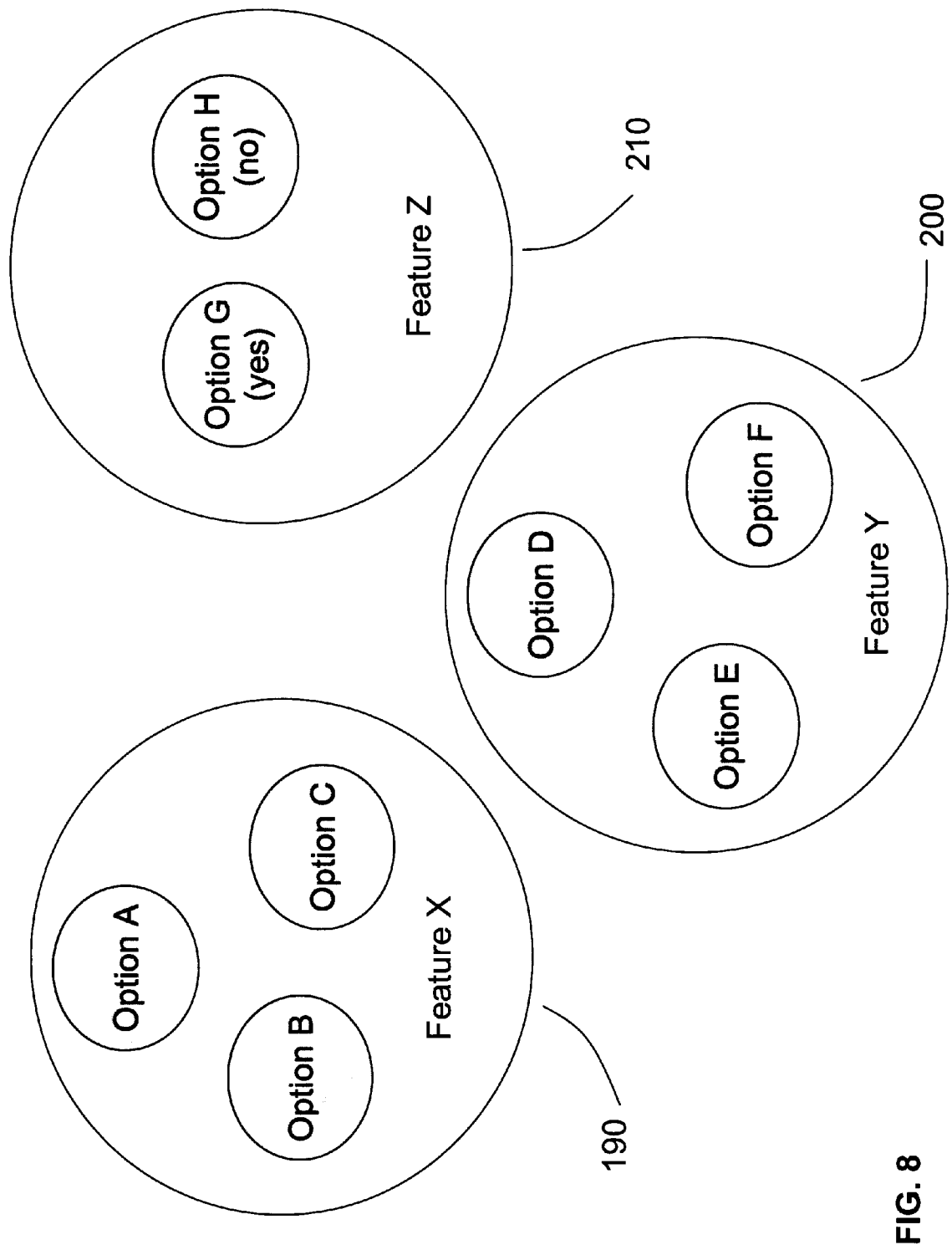
FIG. 8 is a diagram demonstrating the relationship between features and options.

FIG. 8 demonstrates the relationship between features and options. There, feature 190 is composed of three options A, B, and C. Feature 200 is composed of three options D, E, and F. Meanwhile, feature 210 is composed of two options, and these options are binary such that the feature is either present or it is not. Only one option can be selected from each feature in forming a configurable product or service.

As seen in FIG. 1, an aspect of the invention begins by receiving an input data set 10, which may consist of past customer demand or predictive future data, such as econometric analysis. For instance, the input data set 10 could be based on a sales history of what customers have chosen during some time period in the past such that the sales history consists basically of lists of option choices. Ideally, in any input data set 10, each unit sold would be represented by a list of the selected features, or by a serial number that would facilitate readily obtaining this information. Furthermore, the input figures would ideally be in terms of fully configured units of the product or service. Nonetheless, alternative data sources and input methods are possible. For instance, sales history could be pre-aggregated into unique configurations with a total volume for each one. The disaggregated form is preferred because it could come with other information such as dates, cost, and revenue. A raw input data set 10 can be further formatted to produce a formatted data set 20 capable of providing data for the ensuing calculations. Such formatted data set may account for not only the needs of an aspect of the invention but also the needs for any overall process incorporating an aspect of the invention. A define option-sets step 25 may further generate tables of possible option-sets from the formatted data 20, but this step is not required at this phase. FIG. 8 illustrates some option sets.

From that starting point, the invention would have information sufficient to obtain the first-order take rate for a particular option and ensuing take rates for a set of selected options, which is also called an option-set. The first-order take rate is simply the percentage of all of the products or services from the input data set 10 to possess a particular option. All first-order take rates for all options within a feature must tally to 100 percent. The invention may further use a second-order take rate, which represents the probability of an option-set containing option $A_X$ from feature X and option $B_Y$ from feature Y. In fact, the invention may additionally use a third (or higher)-order take rate, which represents the probability of an option-set containing option $A_X$ from feature X, option $B_Y$ from feature Y, and option $C_Z$ from feature Z. Successive order take rates are similarly possible. Because of these many possibilities, the take rate for any option-set (including option-sets of an option for a single feature) will be referred to generally as the joint-take-rate, which, where necessary, will be calculated through the joint-take-rate calculation 30.

Take rates are also called penetration rates or attach rates in different industries. For instance, suppose that the sales history has been aggregated into N unique configurations, that can be indexed as j=1, 2, ..., N. Let v(j) denote the volume associated with unique configuration j, and let V denote the total volume.

$$V = \sum_{j=1}^{N} v(j)$$

Configuration j itself will be represented as (f(j,1), ..., f(j,k), ..., f(j,K)) where k=1, ..., K indexes the features. Then f(j,k) denotes the option for feature k that was included in unique configuration j. To complete this basic notation, let {a(k,1),a(k,2), ..., a(k,m(k))} denote the several alternative options for feature k, where m(k) is the number of alternatives. The first-order take rate for option "a" of feature "k" is defined as (where T stands for take rate):

$$T(k, a) = (1/V) * \sum_{\{j | f(j,k) = a\}} v(j)$$

The notation {j expression(j)} is read as "the set of all j for which expression(j) is true." This take rate is defined for all of the options of feature k, and we have:

$$\sum_{t=1}^{t=m(k)} T(k, a(k, t)) = 1$$

These first-order take rates are defined for the options of each of the features. To illustrate, consider three features from the sales history for an actual car: Color, Trim-Color, and Floor Mats. Tables 1, 2, and 3 show the first-order take rates for Color, Trim-Color, and Floor Mats respectively. Thus, for example, about 20 percent of these cars are Red.

TABLE 1

First-order Take Rates for Color

| | |
|---|---|
| Silver | .1281 |
| Black | .1266 |
| Vanilla | .1737 |
| Red | .2042 |
| Opal | .0022 |
| Blue | .2537 |
| Yellow | .1076 |
| Tangerine | .0039 |
| Total | 1.0 |

TABLE 2

First-order Take Rates for Trim-Color

| | |
|---|---|
| Pebble Beige | .6846 |
| Slate Gray | .3154 |
| Total | 1.0 |

TABLE 3

First-order Take Rates for Floor Mats

| | |
|---|---|
| No | .9847 |
| Yes | .0153 |
| Total | 1.0 |

First-order take rates are computed for single options. Second-order take rates are computed for pairs of options to know the likelihood that an option from one feature will be present with a separate option from another feature. The present notation can be extended to express a second-order take rate for two features k1 and k2 as:

$$T((k1,a1),(k2,a2)) = (1/V) *$$

$$\Sigma_{\{j | f(j,k1) = a1, f(j,k2) = a2\}} v(j)$$

Note: The above mathematical equation has been broken into two lines such that the multiplication performed by the multiplication symbol "*" of the first line is continued on the second line.

As in the single feature case, the second-order take rates for all pairs of options between two features must add to one:

$$\sum_{s=1}^{s=m(k1)} \sum_{t=1}^{t=m(k2)} T((k1, a(k1, s)), (k2, a(k2, t))) = 1$$

Combining the two features, Color and Trim-Color, from the preceding discussion further illustrates second-order take rates. Table 4 shows a sample set of figures. Summing across a row gives the first-order take rate for that Color, and summing down a column gives the first-order take rate for that Trim-Color. In this context, the first-order take rates are called the marginal distributions, and the second-order take rates are called the joint distribution.

TABLE 4

Observed Second-order Take Rates for Color and Trim-Color

|  | Pebble Beige | Slate Gray | Marginal |
|---|---|---|---|
| Silver | .1281 | 0 | .1281 |
| Black | .0969 | .0297 | .1266 |
| Vanilla | .0836 | .0901 | .1737 |
| Red | .1183 | .0859 | .2042 |
| Opal | .0022 | 0 | .0022 |
| Blue | .2537 | 0 | .2537 |
| Yellow | .0018 | .1058 | .1076 |
| Tangerine | 0 | .0039 | .0039 |
| Marginal | .6846 | .3154 | 1.0 |

Take rates of third- and higher order can be defined by analogy with the second-order take rates. Third-order take rates would be for triples, rather than pairs, of options. There are KC3=K!/(3!*(K−3)!)=K*(K−1)*(K−2)/6 possible third-order take rates, which is 1,140 for K=20 (where KC3 is K choose 3, the binomial coefficient). Given any three features, the third-order take rates could be placed in the cells of a cube. Displaying such a cell alignment on paper is difficult, and for four or more features, it becomes graphically impossible. As an alternative, the triples can be simply listed along with their take rates. This kind of display can then be used for any order greater than or equal to 3. The disadvantage of this kind of display is that the marginal distributions are not easily visible.

Figure 2:
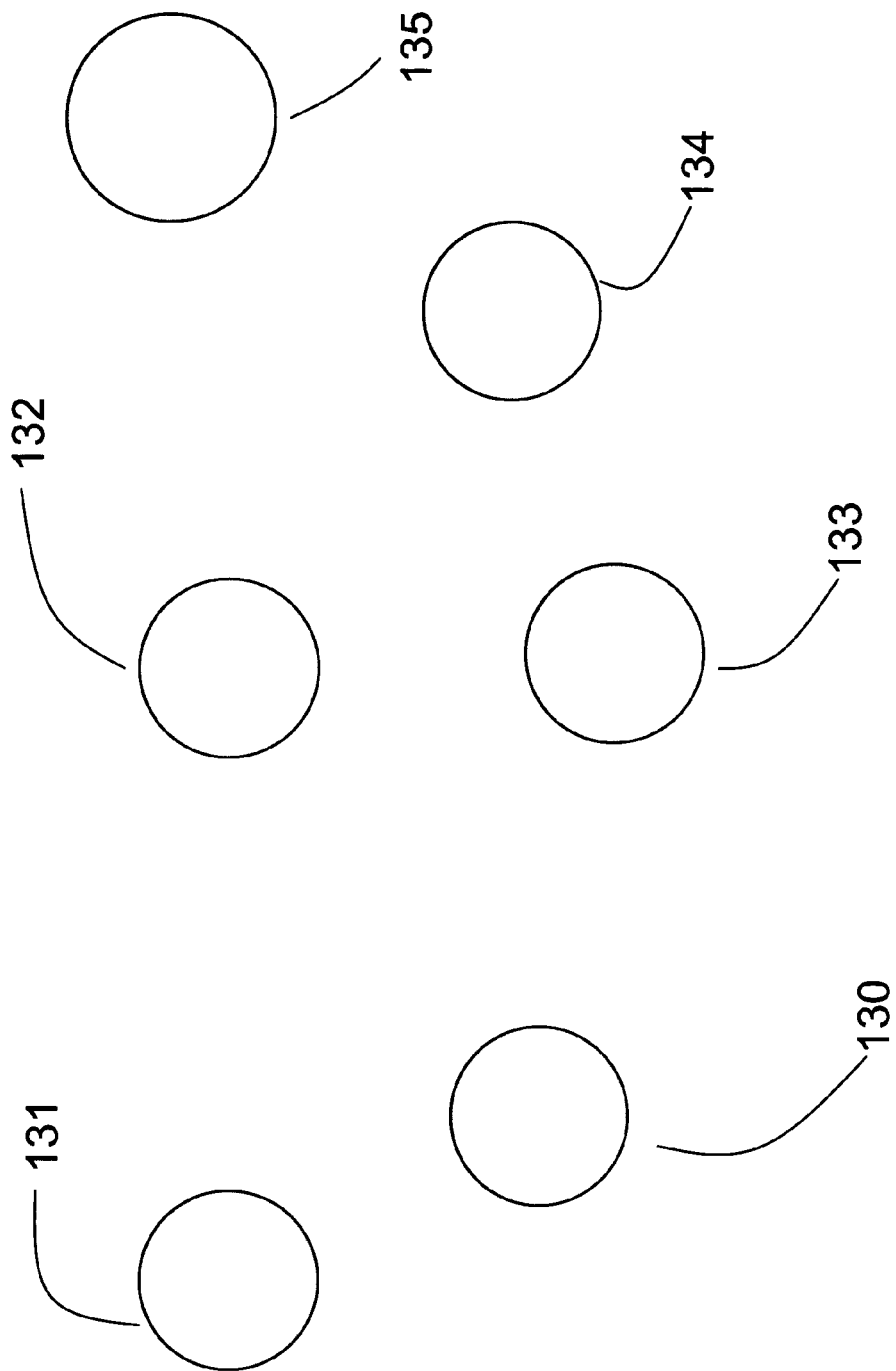
FIG. 2 is an undirected map demonstrating isolated nodes.
Figure 3:
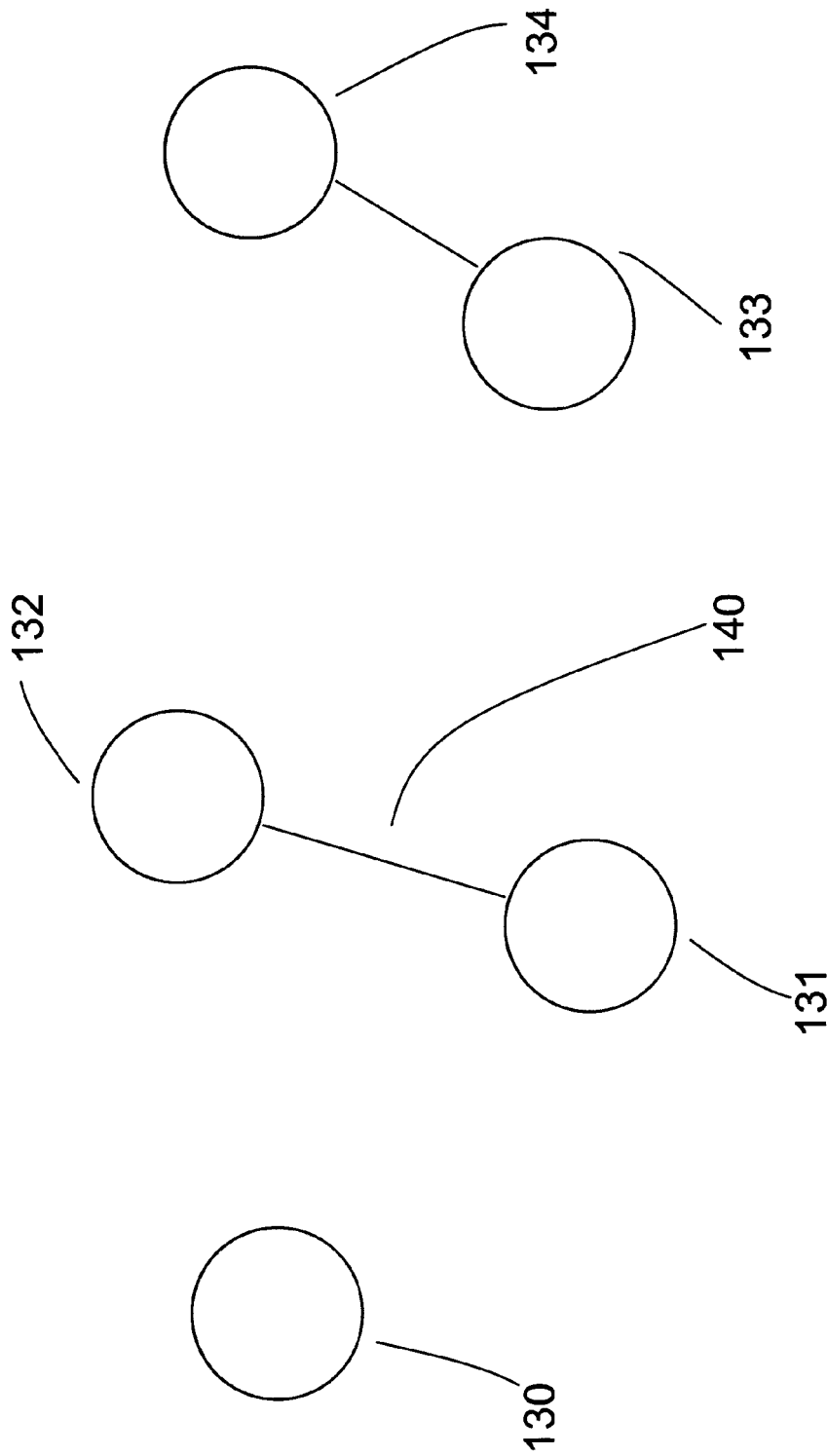
FIG. 3 is an undirected map demonstrating nodes and arcs.

Table 5 shows the third-order take rates for the three features whose first-order take rates were shown in FIGS. 1, 2, and 3: Color, Trim-Color, and Floor Mats. They are sorted from highest to lowest. Note that 8*2*2=32 possible triples exist, and Table 5 only has 24 of them. The other eight triples never occurred in the data, and they have take rates of zero.

TABLE 5

Third-Order Take Rates for Color, Trim-Color, and Floor Mats

| Take Rate | Color | Trim-Color | Floor Mats |
|---|---|---|---|
| .2522 | Blue | Pebble Beige | No |
| .1271 | Silver | Pebble Beige | No |
| .1172 | Red | Pebble Beige | No |
| .1041 | Yellow | Slate Gray | No |
| .0962 | Black | Pebble Beige | No |
| .0883 | Vanilla | Slate Gray | No |
| .0850 | Red | Slate Gray | No |
| .0827 | Vanilla | Pebble Beige | No |
| .0295 | Black | Slate Gray | No |
| .0025 | Tangerine | Slate Gray | Yes |
| .0018 | Vanilla | Slate Gray | Yes |
| .0017 | Opal | Pebble Beige | Yes |
| .0016 | Yellow | Slate Gray | Yes |
| .0014 | Blue | Pebble Beige | Yes |
| .0014 | Tangerine | Slate Gray | No |
| .0013 | Yellow | Pebble Beige | Yes |

TABLE 5-continued

Third-Order Take Rates for Color, Trim-Color, and Floor Mats

| Take Rate | Color | Trim-Color | Floor Mats |
|---|---|---|---|
| .0012 | Red | Pebble Beige | Yes |
| .0011 | Silver | Pebble Beige | Yes |
| .0009 | Vanilla | Pebble Beige | Yes |
| .0009 | Red | Slate Gray | Yes |
| .0007 | Black | Pebble Beige | Yes |
| .0005 | Opal | Pebble Beige | No |
| .0005 | Yellow | Pebble Beige | No |
| .0002 | Black | Slate Gray | Yes |
| 1.0 | | | |

Take rates of any order can be defined in exactly the same way. For q-th order take rates among K features there are KCq=K!/(q!*(K−q)!) different subsets of q features. For K=27 and q=6 this is 230,230, a number that shall be referred to later.

The joint-take-rate calculation 30 works in tandem with the joint-take-rate significance calculation 40, which essentially calculates which relationships pass a significance threshold. As noted earlier, the joint-take-rate calculation 30 may be a table generation wherein the probability of an option-set's occurring within the input data set 10 is extracted. The joint-take-rate significance calculation 40 is essentially a measure of the significance of any relationship found from the comparison of options. One such measure of dependence is the chi-square statistic, which, in its most basic application, is the square of the difference between an observed value and an expected value, divided (or scaled) by the total number of values.

$$\chi^2(k1,k2) = \sum_{s=1}^{s=m(k1)} \sum_{t=1}^{t=m(k2)} \frac{(T((k1, s), (k2, t)) - T(k1, s)*T(k2, t))^2}{T(k1, s)*T(k2, t)}$$

From each cell, (observed−expected)*(observed−expected)/expected is accumulated. Here "observed" is the true second-order take rate as reflected in the input data set 10, and "expected" is what this value would be if the two features were independent. Table 7 shows the contribution of each cell to the total chi-square of 0.4556 for these two features.

The expected value for an option-set comprising two options is the product of their first-order take rates. If feature k1 and feature k2 are statistically independent, then the second-order take rates are just the product of the corresponding first-order take rates:

$$T((k1,a1),(k2,a2))=T(k1,a1)*T(k2,a2)$$

If customers were choosing Color and Trim-Color independently in this example, then the second-order take rates would look like they do in Table 6. These take rates constitute the expected take rates. Note that the marginal distributions are unchanged, even though the joint distribution is quite different. These expected values can then be compared to the observed values.

The null hypothesis is that any two features are independent, and the chi-square value tests that hypothesis. From the comparison of the expected and observed values, a chi-square statistic of 0 means that the options are perfectly independent of each other; a chi-square statistic of 1 means that options A and B are perfectly dependent. A ranking of the feature pairs by their chi-square value will arrange them from most independent (0.0) to most dependent (1.0). Beyond this definitional characteristic of the chi-square value, its use here is somewhat different than in standard statistical application. If the product has K features, then there are KC2 (K choose 2, the binomial coefficient) different pairs of features. This is computed as $KC2=K!/(2!*(K-2)!)=K*(K-1)/2$, which is 190 for K=20. Thus there are 190 different tables like Table 3, and 190 different chi-square values, all between zero and one. A ranking of the feature pairs by their chi-square value will arrange them from most independent (0.0) to most dependent (1.0). A critical value, say 0.1, can be selected such that all pairs to the left (chi-square<=0.1) are declared to be independent, and all pairs to the right (chi-square>0.1) to be dependent. A chi-square significance cutoff value can be set based on experience or by the calibration process described below.

TABLE 6

Expected Second-Order Take Rates for Color and Trim-Color.

|  | Pebble Beige | Slate Gray | Marginal |
| --- | --- | --- | --- |
| Silver | .0877 | .0404 | .1281 |
| Black | .0867 | .0399 | .1266 |
| Vanilla | .1189 | .0548 | .1737 |
| Red | .1398 | .0644 | .2042 |
| Opal | .0015 | .0007 | .0022 |
| Blue | .1737 | .0800 | .2537 |
| Yellow | .0737 | .0339 | .1076 |
| Tangerine | .0027 | .0012 | .0039 |
| Marginal | .6846 | .3154 | 1.0 |

TABLE 7

Details of the Chi-Square Computation

|  | Pebble Beige | Slate Gray | Total |
| --- | --- | --- | --- |
| Silver | .0186 | .0404 | .0590 |
| Black | .0012 | .0026 | .0038 |
| Vanilla | .0105 | .0227 | .0332 |
| Red | .0033 | .0072 | .0105 |
| Opal | .0003 | .0007 | .0010 |
| Blue | .0368 | .0800 | .1168 |
| Yellow | .0701 | .1525 | .2226 |
| Tangerine | .0027 | .0060 | .0087 |
| Total | .1435 | .3121 | .4556 |

The choice of the independence cutoff may seem rather arbitrary, but there is a way to calibrate its value from the historical data being modeling. Suppose that the historical data has N unique configurations and a total volume of V units of the product, with V>N. Now, suppose setting the independence cutoff at a value x, between zero and one, and using this methodology to simulate demand for V units of the product. Let $u(x)$ equal the number of unique configurations. If x=0, then every pair of features will be treated as dependent, and a significant relationship will be found between every feature (a massive clique, as defined below). The simulation will not be able to produce any configuration that was not in the original data, and some of the low take rate configurations may not appear. So $u(0)<=N$. On the other hand, if x=1, then only pairs of features that are perfectly related (as by a rule) will be treated as dependent, and the dependence graph may consist entirely of features without any relationship to each other (isolated nodes, as defined below). In this case any configuration that satisfies the rules is possible and all of the configurations that are generated will be unique, which would be $u(1)=V>N$. This means that $u(x)$ is an increasing function that starts below N and finishes above N. This further means that, by trial and error, (including an embodiment through a repeat step 50) a value $x^{*'}$ can be determined such that $u(x^{*'})$ is approximately N. Note that $u(x)$ is really a random variable, but the variation for a given x is generally less than 2 percent. So, the calibration process consists of simulating batches of V units using different values of the independence cutoff until the approximately right number of unique configurations is obtained. A calibration in the preceding matter may be conducted by iterating through all steps to produce a set of configurable products and services, then parsing that set to determine the sufficiency of the significance cutoff (for instance, whether its number of unique configurations is within a certain percentage such as two percent of the number of unique configurations within the input data set), and then setting a new significance cutoff if the prior significance cutoff was too high or too low. Such a cutoff would then be used in iterating through each of the steps to produce a new set of configurable products or services until an appropriate significance cutoff is found such that the configurable product or service set may be kept for further use, as discussed later. One possible reference point in determining whether the significance cutoff is sufficient is comparing the number of unique configurations produced by the output data set with the number of unique configurations in the existing input set. If the comparison falls within an accepted tolerance level, such as two percent, then the significant cutoff may be found sufficient to proceed. If not, the repeat step 127 is followed to recalibrate the significance level.

An alternative measure of dependence is based on the absolute deviation between the observed and expected:

$$D(k1, k2) = \sum_{s=1}^{s=m(k1)} \sum_{t=1}^{t=m(k2)} \frac{|T((k1, s)(k2, t)) - T(k1, s)^* T(k2, t)|}{T(k1, s)^* T(k2, t)}$$

Working with the chi-square measure is preferable, however, because any relationship between two features will yield a measure between 0 and 1. No similar measure is present for the absolute deviation measure.

This introduction to take rates of first, second, and ensuring orders lays the foundation for explaining the best method of practicing the invention. After receiving the input data set, the first-order take rates for each couplet of features are obtained. Then, the second-order take rates for each triplet of features are obtained. (The use of "obtained" is purposeful here as the input data set may provide this information directly or the information may need to be calculated based on the input data.) Each triplet that passes the significance threshold determined through the chi-square analysis is grouped together. That is, Features A, B, and C that are determined to be significant via chi-square analysis are considered together. Moreover, if Features D and E are significant to Feature B, then they are grouped with Feature B such that Features A, B, C, D, and E are all considered part of the same grouping even if no relationship is found among A, C, D, and E. The groupings that are determined will be composed of n features, and the n-order take rates will need to be obtained for that grouping if it is not already known. For instance, the above grouping of five features would use the fifth-order take rates. That n-order take rate will be a basis for a weighted random selection. The weighted random selections from groupings of features will be combined to form a configurable product or service or may be used for such other purposes as parts and product forecasting.

Figure 4:
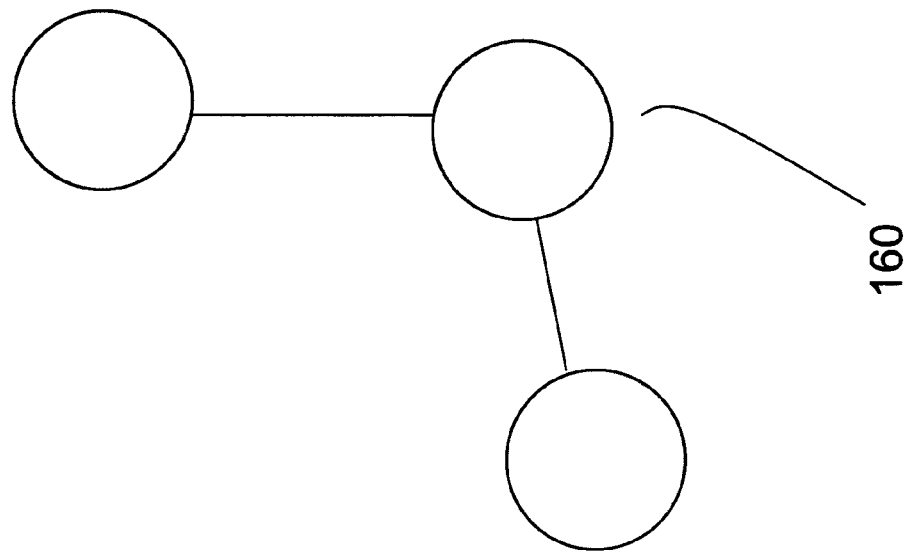
FIG. 4 is an undirected map demonstrating trees.
Figure 4:
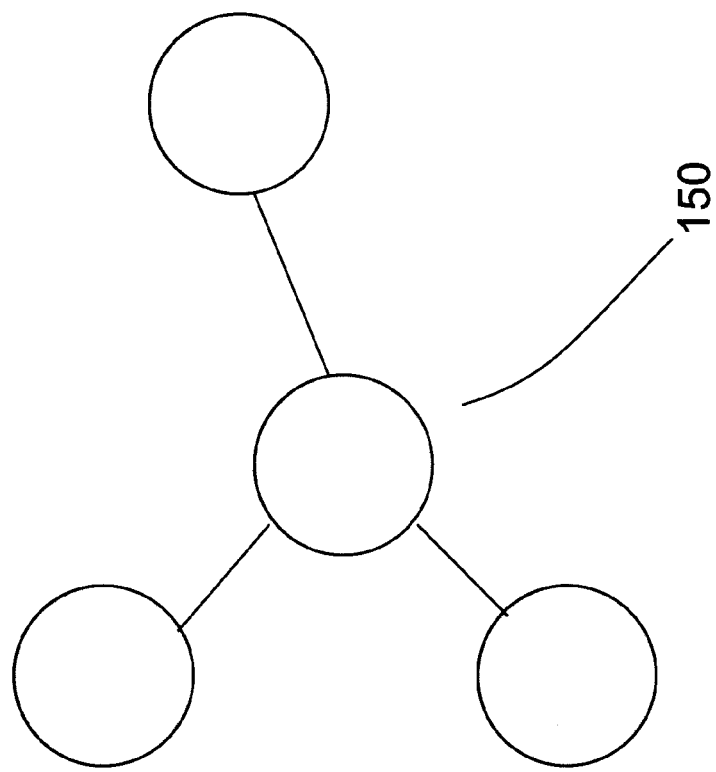
Figure 5:
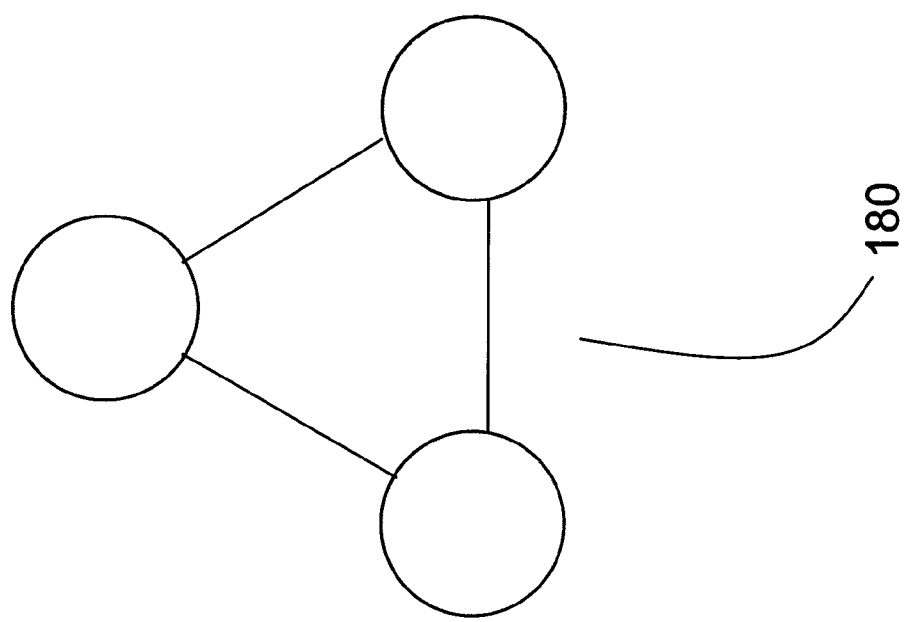
FIG. 5 is an undirected map demonstrating a node, a tree, and a clique.
Figure 5:
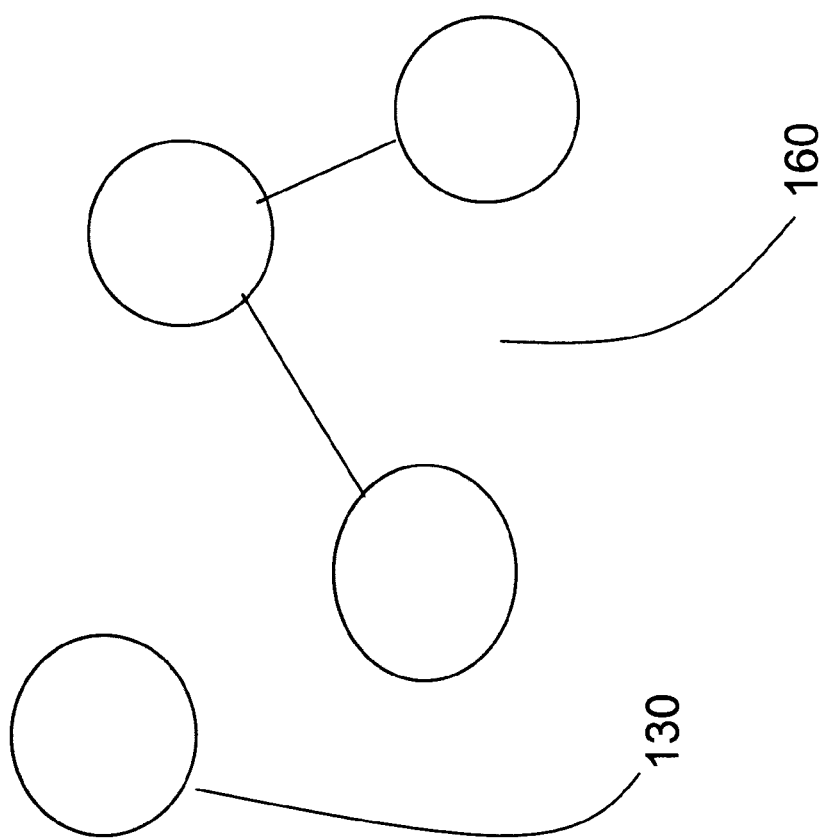
Figure 6:
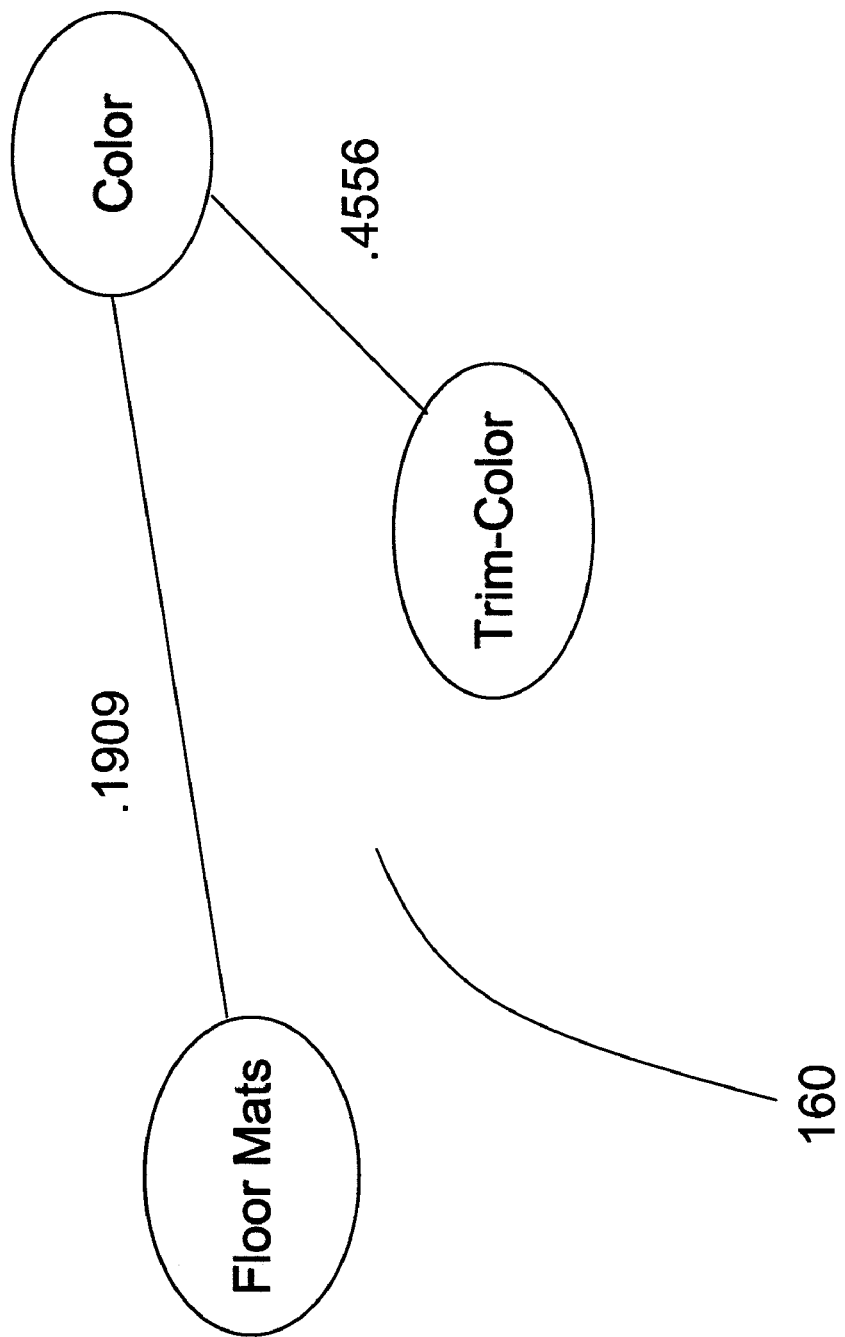
FIG. 6 is an undirected map demonstrating relationships between particular options in a tree.
Figure 7:
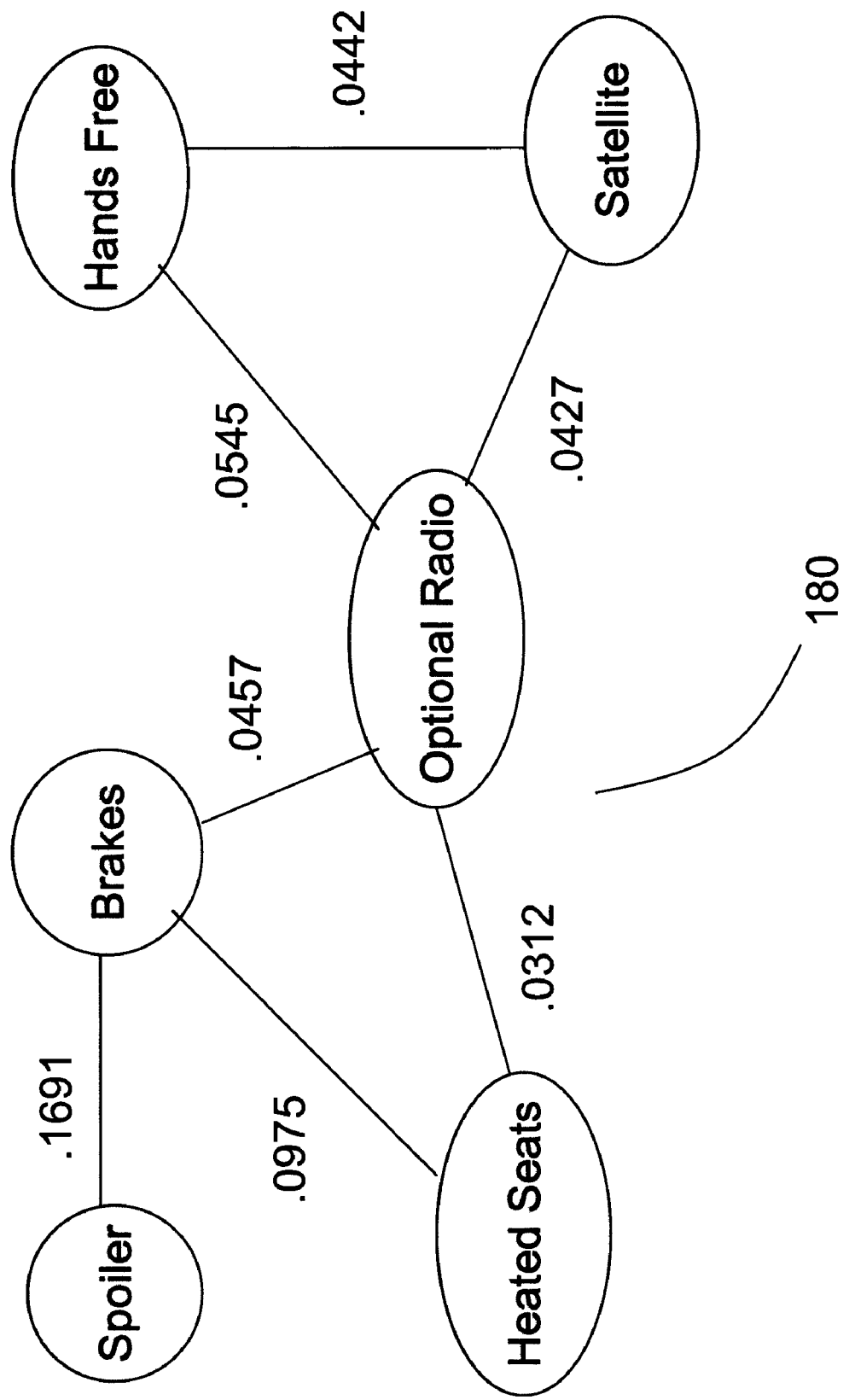
FIG. 7 is an undirected map demonstrating relationships between particular options in a tree.

Take rates—and applying them as an aspect of this invention—may be best understood by viewing them as an undirected dependence graph consisting of nodes representing the product features, and arcs 140 representing dependence relationships between those nodes offers the best way to understand these relationships to identify components 60. (Directed graphs, on the other hand, have their arcs drawn as arrows, and there is a distinction between being at the head of the arrow or at the tail.) For these purposes, the graph will be populated with various combinations of the following components: nodes 130 through 134, trees 150 and 160, and cliques 180. An option with no relationship is graphically represented as a single node. A strong component with n nodes and where n>1 and (n−1) arcs are present is called a tree and represented as a set of connected nodes. Because a tree lacks cycles, procession along an arc from any node in a tree does not permit return to that node without retracing at least one arc. If the chi-square for features A and B exceeds the significance threshold, then an arc is drawn from the node for A to the node for B. This arc can be labeled with the chi-square value. There are K*(K−1)/2 potential arcs, but only those that exceed the independence cutoff are actually drawn. FIG. 2 shows the simple case where all of the chi-square values are below the independence cutoff. All of the feature nodes are isolated. In FIG. 3, some pairs of nodes are connected. FIG. 4 and FIG. 5 show more interesting cases consisting of trees and cliques. FIG. 6 and FIG. 7 show nodes joined relationships based on chi-square values.

Whether a component is a node, tree, or clique generally does not necessarily matter for the random weighted selection from components 70 because the features have already been grouped with those other features with which they are most closely associated. Each component has a set of possible option-sets. For a node, those option-sets are equivalent to the number of options present for the node's corresponding feature. Therefore, the likelihood of any node's occurring is equivalent to its first-order take rate. For a tree or clique, each option-set's joint-take-rate reflects the likelihood of its occurring.

To simulate future demand for any component, an option-set is chosen through a weighted random selection from each component using that component's joint-take-rates (or, in the case of a node, its first-order take rate) as the weight. For expository purposes, this random selection is equivalent to one "roulette wheel" per component, wherein a proportion of the roulette wheel's diameter has been allotted to each option-set based on that option-set's joint-take-rate. In practice, a standard Monte Carlo methodology would be used to generate the weighted random selection of an option-set. This methodology involves generating a uniform random number in the range from zero to one, and then using the inverse of the cumulative distribution function F to determine a specific option-set. If feature k has m(k) alternative options, the figurative roulette wheel has m(k) sectors, where the size of each sector is proportional to the corresponding take rate. An option is chosen by spinning the roulette wheel. Simulating a complete order means spinning K roulette wheels.

FIG. 3 provides a visual display of the approach. A choice can be simulated for feature 130 using its first-order take rates as described above. Features 131 and 132 are dependent, and this aspect of the invention uses the corresponding set of second order take rates because the choices for features A and B should be made jointly. If a feature A (or 131) has m(A) options and a feature B (or 132) has m(B) options, then there are m(A)*m(B) cells in the table of second order take rates. Accordingly, a figurative roulette wheel would exist with m(A)*m(B) sectors, where the size of each sector is proportional to the corresponding second order take rate. The options for A and B are determined by spinning this one weighted roulette wheel. Simulating a complete order in this case would involve three roulette wheels, one for each strong component: features 130; feature 130+feature 131 (combined); and feature 133+feature 134 (combined).

Whether a component is a tree can have implications for calculating demand under an alternative random selection process. Because trees do not have cycles, random selection is possible using only first- and second-order take rates. Under such an approach with a tree composed of features {R,S,T}, a choice for S is simulated using the first-order take rates for S. This choice is then combined with the (R,S) second-order take rates and used to compute the conditional distribution over the R options, given the S option that has already been chosen.

Then, this conditional distribution, referred to as the (R|s) distribution, is used to choose the R option. The same methodology works for the T option. Similarly, an option W can be selected based on W's first-order take rates, and then used within the (X|w), (Y|w), and (Z|w) conditional distributions to choose options for X, Y, and Z respectively.

Such use of only first- and second-order take rates for trees suggests a different modeling strategy. For instance, considering any clique that is not a tree and treating the chi-square values for the arcs as weights based on the significance of the relationship between the connected nodes, some arcs could be dropped to turn the clique into a tree and keep the maximum weights. This approach would be an instance of the maximum weight spanning tree problem, for which an efficient algorithm exists. Such an algorithm could be used to turn each general clique into a tree, and then save only first- and second-order take rates. When such a strategy has been pursued, however, the conclusion was that the strategy does not produce as good forecasts as those produced by using higher order take rates.

A combining of random selections 80 brings each of these randomly selected option-sets together to form a configurable product or service. If the configuration is invalid because of rules, then under a preferred embodiment, the roulette wheels are run again.

A rules validator 90 may necessitate that the random selection from components 70 be repeated via repeat step 100 if the resulting combination 80 leads to an invalid product or service configuration. As discussed earlier, a rules validator 90 is essentially a collection of rules that prevents one option from being combined with another option. For instance, a car manufacturer may adopt a rule wherein cars with the most expensive radio option cannot have the least expensive stereo option. Alternatively, a car manufacturer may also adopt a rule wherein cars with gray leather seat cushions must be paired with gray leather back cushions. Such rules comprising a rules validator could be fed into the process through the original input data set 10, could be separately inputted at a later stage, or could be hardwired into a particular application of the invention. Performing the step last is typically the best mode because as the number of features and options within those features grows, execution of a rules validator can slow the take rate calculations for option-sets.

If the configuration passes the rules validator 90, then a configurable product or service 110 results. The process of configuration selection can continue through a repeat step 120 to generate as many configurable services as a manufacturer or service provider wishes to produce in an outset set 125. For a manufacturer wishing to produce 10,000 end units of a product, the repeat 120 would be used multiple times to produce this result.

A system based on random selection—even the weighted random selection discussed above—is potentially open to generating too many outliers, particularly when random selection produces a small number of end units. Accordingly, one solution is to execute either the entire process or merely execute repeat step 120 some multiple of the number of times that it initially executes. Under one embodiment of the invention, each execution creates a point-forecast that, together with the other forecasts, can be further used through statistical analysis to determine the quantities of configurable product or service that should be produced. Under an additional embodiment of the invention, the produced set of configurable products or services can then be subject to an optimization routine that would consider such concerns as cost to the producer or provider and the consumer's willingness to accept substitutes. Under another additional embodiment of the invention, the output data can be used to forecast parts needs. A further embodiment of the invention would focus on the statistical information generated and incorporate that in separate forecasts.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications.

I claim:

1. A process for modeling demand for a configurable product or service, comprising the steps of:
   (a) providing an input data set to a processor containing a plurality of features, each feature comprising one or more options for the configurable product or service;
   (b) defining a plurality of first option-sets with a processor, wherein each first option-set comprises one or more selectable options corresponding to a feature;
   (c) defining a first order joint-take-rate with a processor as comprising a combined probability of choosing each available option within a first option-set, defining a second order joint-take-rate with a processor as comprising a combined probability of choosing pairs of options available within two first option-sets;
   (d) obtaining a second-order joint-take-rate for pairs of first option-sets with a processor;
   (e) determining if correlations exist among the second order joint-take-rates of the pairs of first option-sets with a processor;
   (f) if correlations exist among the joint-take-rates for pairs of the first option-sets, then grouping features with a processor corresponding to the related first option sets together to form feature-sets;
   (g) calculating an n-order joint-take-rate for each feature-set formed from the grouping with a processor, wherein n corresponds to a number of first option-sets forming a respective feature-set;
   (h) creating second option-sets corresponding to each of the plurality of feature-sets with a processor using a weighted random selection that relies on the n-order joint-take rate of a respective feature-set;
   (i) combining the second option-sets with a processor to define at least one configurable product or service; and
   (j) displaying the second option-sets on an output device.

2. The process of claim 1, further comprising a step of: creating a rules validator to validate said at least one configurable product or service, wherein steps (h)-(j) are repeated if said configurable product or service is found to be invalid.

3. The process of claim 1, further comprising a step of: parsing said input data to produce a formatted data input set that allows a calculation of a first order joint-take-rate for each first option-set.

4. The process of claim 1, wherein determining if correlations exist among the second order joint-take-rates of the pairs of first option-sets comprises determining if a chi-square value is greater than a predetermined threshold.

5. The process of claim 1, wherein said first option-sets contain at least two options.

6. The process of claim 1, wherein steps (h)-(j) are executed once for each unit of a product intended to be produced for an inventory.

7. The process of claim 1, further comprises creating a rules validator that bars calculation of invalid second option-sets.

8. The process of claim 6, wherein step (h) is further executed for a multiple of the number of products in said inventory for the purpose of determining outliers in said inventory.

9. The process of claim 8, further including the step of: abandoning an inventory and substituting alternative into its place based on a determination that said outliers fall outside a predetermined tolerance factor.

10. The process of claim 8, wherein said multiple is at least 3.

11. The process of claim 4, wherein said threshold is automatically determined.

12. The process of claim 4, wherein said threshold is determined through the steps of:
    choosing a threshold;
    iterating through steps (h) through (j) until a set of configurable products or services is created; and
    accepting said set if its number of unique configurations is comparable to the number of unique configurations in said input data set.

13. The process of claim 1, wherein steps (h)-(j) are executed a predetermined number of times.

14. The process of claim 1, wherein using a weighted random selection further comprises using a Monte Carlo methodology.

15. The process of claim 14, wherein the Monte Carlo methodology comprises generating a uniform random number in the range from zero to one, and then using an inverse of a cumulative distribution function.

16. A computer program product comprising a computer usable medium having a computer readable program code embodied therein, said computer readable program code adapted to be executed to implement a method for modeling demand for a configurable product or service, said method comprising:
    (a) providing an input data set containing a plurality of features, each feature comprising one or more options for the configurable product or service;
    (b) defining a plurality of first option-sets, wherein each first option-set comprises one or more selectable options corresponding to a feature;
    (c) defining a first order joint-take-rate as comprising a combined probability of choosing each available option within a first option-set, defining a second order joint-take-rate as comprising a combined probability of choosing pairs of options available within two first option-sets;
    (d) obtaining a second-order joint-take-rate for pairs of first option-sets;
    (e) determining if correlations exist among the second order joint-take-rates of the pairs of first option-sets;

(f) if correlations exist among the joint-take-rates for pairs of the first option-sets, then grouping features corresponding to the related first option sets together to form feature-sets;

(g) calculating an n-order joint-take-rate for each feature-set formed from the grouping, wherein n corresponds to a number of first option-sets forming a respective feature-set;

(h) creating second option-sets corresponding to each of the plurality of feature-sets using a weighted random selection that relies on the n-order joint-take rate of a respective feature-set;

(i) combining the second option-sets to define at least one configurable product or service; and (j) displaying the second option-sets on an output device.

17. The computer program product of claim 16, wherein determining if correlations exist among the second order joint-take-rates of the pairs of first option-sets comprises determining if a chi-square value is greater than a predetermined threshold.

18. The computer program product of claim 17, wherein said threshold is automatically determined.

* * * * *